United States Patent [19]

Jeutter

[11] Patent Number: 5,456,540
[45] Date of Patent: Oct. 10, 1995

[54] PAPER FEED MECHANISM FOR INTERIOR DRUM TYPE PRINTER

[75] Inventor: Andreas Jeutter, Steinheim, Germany

[73] Assignee: Eastman Kodak Company, Rochester, N.Y.

[21] Appl. No.: 353,033

[22] Filed: Dec. 8, 1994

[30] Foreign Application Priority Data

Dec. 24, 1993 [DE] Germany ................ 43 44 493.8

[51] Int. Cl.⁶ .................................................. B41J 13/02
[52] U.S. Cl. ........................... 400/634; 400/642; 400/88; 101/232; 346/138
[58] Field of Search .................. 101/232, 233; 400/158, 48, 139, 26, 88, 634, 642; 226/198; 346/138

[56] References Cited

U.S. PATENT DOCUMENTS

| | | | |
|---|---|---|---|
| 4,293,864 | 10/1981 | Scott | 346/766 |
| 4,492,159 | 1/1985 | Clark | 101/336 |
| 4,591,281 | 5/1986 | Howard et al. | 400/642 |
| 4,595,957 | 6/1986 | Holtthusen | 358/290 |
| 5,353,360 | 10/1994 | Ohara | 400/88 |

FOREIGN PATENT DOCUMENTS

| | | | |
|---|---|---|---|
| 0045788 | 6/1988 | European Pat. Off. | G01D 15/16 |
| 4216055 | 8/1992 | Japan | 400/88 |

OTHER PUBLICATIONS

Eberhard Friemel; "An Interior Drum Type Recorder Linotronic 630"; Deutscher Drucker; No. 34, Sep. 9, 1993; pp. 2–8.

Primary Examiner—Eugene H. Eickholt
Attorney, Agent, or Firm—Milton S. Sales

[57] ABSTRACT

An interior drum type printer includes a paper feed mechanism permitting quick and simple paper advance to a printing position. This is attained in that a print head is connected to a paper feed means which is mounted for controlled rotation together with the print head about a shaft arranged within the printing drum.

7 Claims, 2 Drawing Sheets

PAPER FEED MECHANISM FOR INTERIOR DRUM TYPE PRINTER

BACKGROUND OF THE INVENTION

1. Technical Field

The invention relates to an interior drum type printer comprising a paper feed mechanism, in which paper to be printed can be fed to the interior surface of a printing drum by means of a paper feeder provided with a deflectable feed roller, a shaft being arranged in the drum center along which a print head can be moved.

2. Background Art

From EP 0 045 788, an inkjet printer is known whose print head is supported to pivot about a shaft. Paper transport to the print head is effected by means of arcuately arranged transport rollers, with the rollers being eliminated in the immediate print head area so that there is the possibility of the paper during printing not being pressed against the drum's cylindrical wall section facing the print head. Line-by-line printing is effected by pivoting the print head about said shaft. Subsequently, the paper is advanced by one line spacing by means of the transport rollers to print the following line in the described manner.

An essential disadvantage of this printer is the sophisticated arrangement and shape of the transport rollers as well as their controlling the paper advance in response to the print head being pivoted. Moreover, the manner in which the transport rollers are positioned does not guarantee that the paper contacts the paper supporting surface in the print head area. Due to differing paper/print head spacing occurring thereby, unsharp print-out is produced. Another disadvantage is that during paper transport a backlash between paper and transport rollers may occur which leads to varying line spacings.

From the journal "Deutscher Drucker", No. 34, Sep. 12, 1991, an interior drum type recorder "Linotronic 630" is known, in which magazined photographic web material that can be unwound and taken up is drawn through a hollow drum by means of a motordriven take-up magazine. During advance, the photographic material is sucked to the interior surface of the drum by applying a vacuum. In the drum center, an advancing system for a light source and related optical means is arranged on a shaft, said system being movable along said shaft. During horizontal movement of the optical system the photographic material is exposed in vertical direction.

Since such apparatus are not intended for printing on paper, the solution is not suitable for interior drum type printers either. For example, sheet paper cannot be printed due to the transport means guiding only continuous paper through the drum. Also, sucking the photographic material to the interior surface of the drum by vacuum is technically too complicated for interior drum type printers and is not effective.

DISCLOSURE OF THE INVENTION

It is the object of the present invention to design an interior drum type printer permitting quick and simple paper feed warranting highly reproducible paper positioning. According to the invention, this is attained in that the print head is connected to a paper feed means which is mounted for controlled rotation together with the print head about a shaft arranged within the printing drum. The print head is arranged at one end of a support and the paper feed means is mounted at the opposite end of the support offset by 180 angular degrees. The support and the shaft are connected by means of stepper motors so that the support provided with print head and paper feed means can perform translatory and rotary movements along and about, respectively, the shaft arranged in the printing drum.

The arrangement according to the invention is extremely space-saving. Moreover, it is advantageously achieved that for paper feed to the printing drum, no separate transport rollers are required. During pivotal movement of the support caused by a stepper motor the paper to be printed is engaged by the paper feed means and fixed by paper retaining elements pivotally arranged along the lateral edges of the circular end faces of the printing drum. During another rotation of the support by means of a stepper motor, the print head is moved to a predetermined printing position. Thus, both paper feed and positioning for an interior drum type printer are realized in an easy manner.

Another advantage of the arrangement is that during the printing operation, the paper need not be moved so that backlash effects caused by paper advance is excluded. Generally, in this arrangement the exact positioning of the characters to be printed depends on the exact positioning of the print head which, however, is easily achieved by means of precise adjusting means.

Use of the printing drum as a connecting element for the housing portions of a laptop computer offers the advantage that the interior drum type printer is integrated in the computer. A housing portion holding the keyboard is fixedly connected to the printing drum and a housing portion holding the screen is hinged to the printing drum shaft.

BRIEF DESCRIPTION OF THE DRAWINGS

Further advantages of the invention will be apparent from the subclaims and from an embodiment of the invention explained with reference to the drawings in which:

BEST MODE FOR CARRYING OUT THE INVENTION

Figure 1:
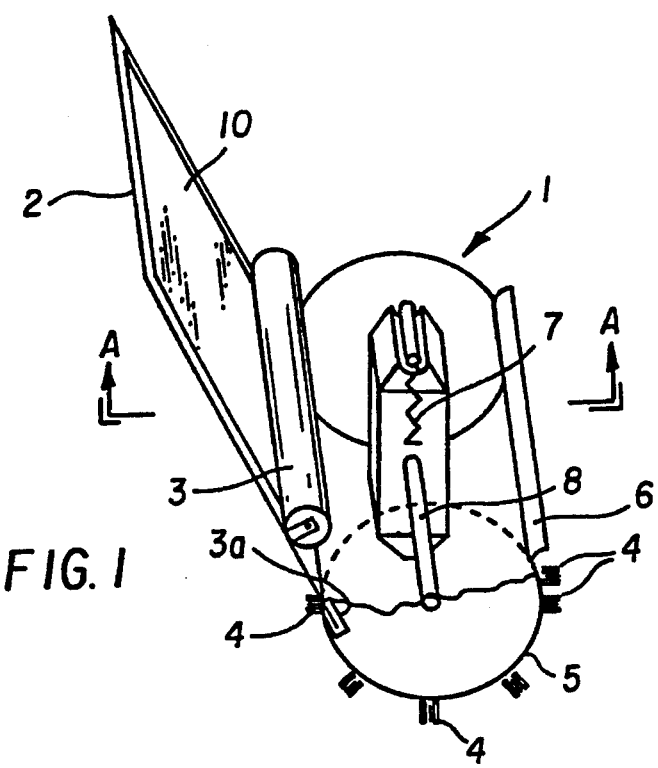
FIG. 1 shows an interior drum type printer in a schematical and perspective representation.
Figure 2:
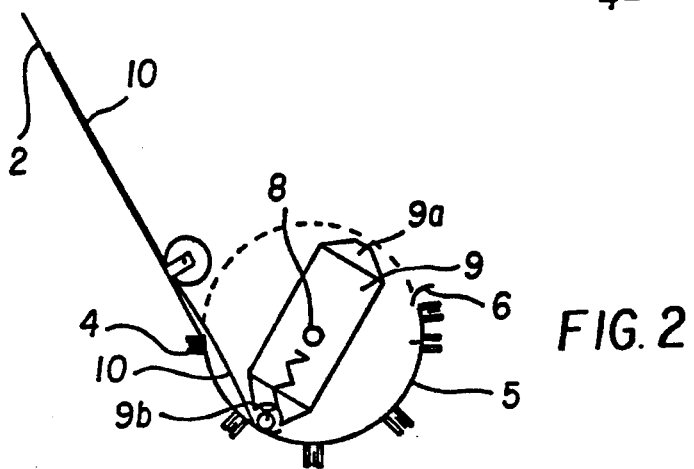
FIGS. 2 and 3 show a cross-section of the printer according to FIG. 1 along line A—A in different paper feed positions.
Figure 3:
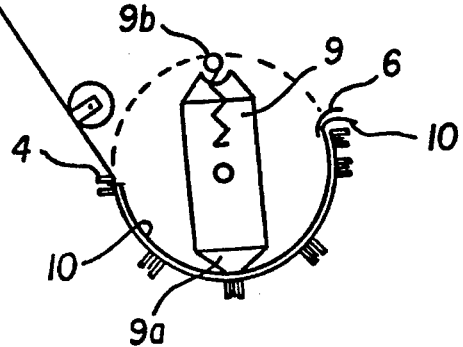
Figure 4:
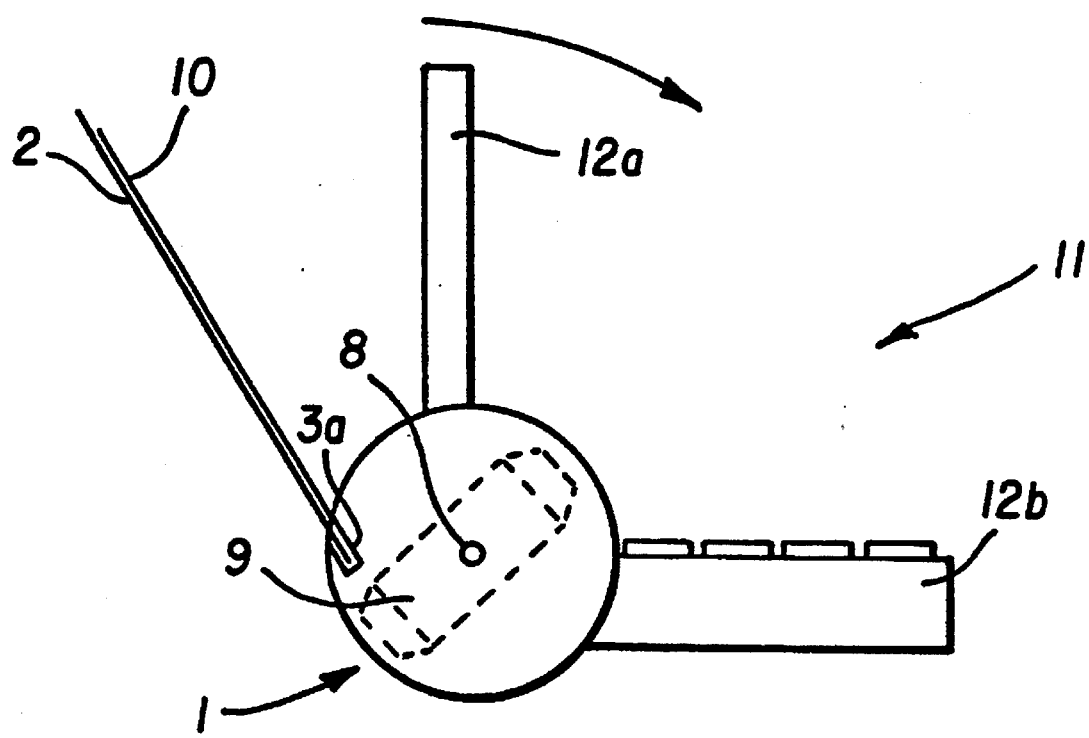
FIGS. 4 and 5 show a schematic representation of the printer according to FIG. 1 as a connecting element for a portable computer.
Figure 5:
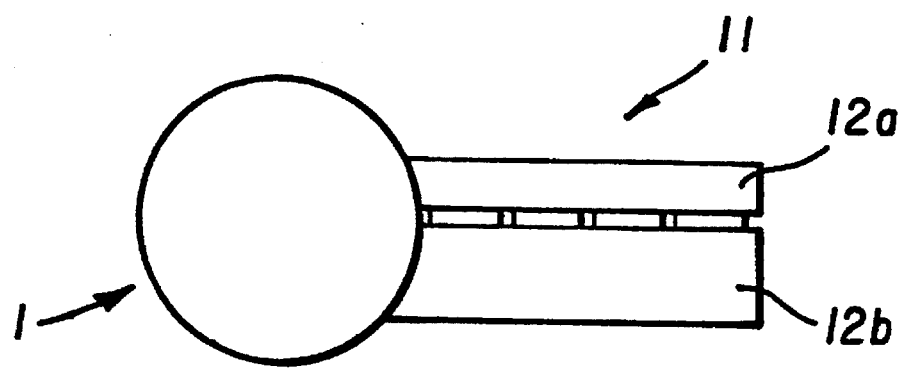

The interior drum type printer according to the invention features a printing drum 1 having a cylindrical surface which is open on top in an area of about 150 angular degrees. A paper feeder 2 by means of which paper 10 to be printed, in the form of individual sheets or continuous paper, is supplied to the printing drum 1 by means of a deflectable feed roller 3 is fixed together with the feed roller 3 to drum 1 by releasable locking elements 3a. A print head 9a and a paper feed means 9b biased by a pressure spring 7 towards the interior drum surface are mounted to a support 9 arranged on a shaft 8 located in the center of the printing drum 1. The paper feed means 9b is formed as a rubberized roller-shaped element. Support 9 can be freely rotated about said shaft 8 and moved along shaft 8 by means of stepper motors (not illustrated). At the edges of the two circular end faces 5 of drum 1, paper retaining elements 4 are arranged which are oriented towards the center point of drum 1 and can be raised and lowered and whose movements are controlled by solenoids (not illustrated). A plate 6 is provided for improved paper guidance and formed as a part that can be inserted on printing drum 1.

The paper sheet 10 to be printed is supplied to the feed roller 3 via feeder 2 so that said roller 3 is deflected an amount corresponding to the paper thickness. An electrical signal generated as a result thereof effects that, on the one hand, a lifting movement of the paper retaining elements 4 is performed by means of the solenoids and, on the other hand, the support 9 carrying the paper feed means 9b designed as a spring-biased, rubberized roller-shaped element is rotated to a position in which the leading edge of the paper sheet is engaged by the paper feed means 9b. Such paper feed position corresponds to an angular position of the stepper motor stored in a memory of computer 11. Due to the static friction, the leading edge of the paper sheet, according to the speed of the stepper motor, is gradually moved to a predetermined position which is independent of the paper size used. The angular position of the stepper motor is also stored in computer 11 as a fixed value.

Due to the fact that the printing drum 1 has a diameter permitting to completely store a DIN A4 sized paper sheet, continuous paper after printing is gradually moved to said predetermined position by said means 9b.

When the stepper motor responsible for rotating the support 9 reaches its predetermined position, a control signal generated by the computer causes the solenoids to lower the paper retaining elements 4. Such lowering produces another control signal causing the said stepper motor to rotate the support 9 with its print head 9a to a printing position predetermined by the computer program, rotation of the support 9 being effected in clockwise direction so that the spring-biased paper feed means 9b slides over the paper guiding plate 6.

During the printing operation, the angular position of the stepper motor responsible for rotation of the support 9 about shaft 8 is maintained until printing of the first line is completed. For this purpose, the print head 9a is moved along the shaft 8 by means of the second stepper motor. Thus, the printing of the first line initiated by a control signal corresponding to the predetermined number of columns is completed, the print head 9a is pivoted to the following line and the printing operation is re-started. Due to the surface of the printing drum 1 not being completely closed, the paper feed means 9b arranged at the opposite end of support 9 can freely rotate in the empty space despite the spring bias while the print head is being pivoted from line-to-line.

After termination of the printing operation, the support 9 with the paper feed means 9b is moved to the position of the sheet trailing edge. Due to static friction, similar to that occurring during paper feed, the printed sheet is moved out of drum 1 via the paper guide 6.

The printing drum 1 is used as a connecting element for the housing portions 12a, 12b of a laptop computer, the housing portion 12b which holds the keyboard being fixedly connected to the printing drum 1 and the housing portion 12a holding the screen being hinged to the shaft 8 of drum 1. For unobstructed paper advance, the paper feeder 2 is arranged behind the housing portion 12a holding the screen.

For operating the interior drum type printer integral with computer 11, the paper feeder 2, the feed roller 3 and the paper guiding plate 6 must be connected to the locking elements 3a after opening the housing portion 12a. Removing the above-mentioned components in reversed order permits the housing portion 12a to be closed again.

The invention has been described in detail with particular reference to preferred embodiments thereof, but it will be understood that variations and modifications can be effected within the spirit and scope of the invention.

What is claimed is:

1. An interior drum type printer having a print drum adapted to receive paper on an interior cylindrical surface, a shaft aligned with the cylindrical axis of the surface, and a print head movable along the shaft; a paper feed mechanism associated with the print drum for feeding paper to the interior surface of the print drum, said feed mechanism comprising:

a deflectable feed roller;

a paper feed means; and means mounting the paper feed means to the print head for controlled rotation therewith about the shaft.

2. A paper feed mechanism as set forth in claim 1 wherein:

the print head is arranged at one end of a support; and the paper feed means is mounted at the opposite end of the support.

3. A paper feed mechanism as set forth in claim 1 wherein the paper feed means comprises a rubberized roller-shaped element which is movable towards the printing drum by means of a pressure spring.

4. A paper feed mechanism as set forth in claim 3 wherein the support is connected to the shaft by means of stepper motors so as to perform translatory and rotary movements.

5. A paper feed mechanism as set forth in claim 1 wherein the printing drum comprises a drum surface having circular end faces, and further comprising paper retaining elements arranged along the edges of the circular end faces, said elements being adapted to be raised and lowered by solenoids.

6. A paper feed mechanism as set forth in claim 1 wherein the paper feed roller is connected to the outer surface of the printing drum by means of releasable locking elements.

7. A laptop computer, a keyboard housing, and a screen housing, said computer comprising an interior drum type printer comprising a a print drum adapted to receive paper on an interior surface, a shaft in the drum center, and a print head movable along the shaft; a paper feed mechanism associated with the print drum for feeding paper to the interior surface of the print drum, said feed mechanism comprising:

a deflectable feed roller;

a paper feed means; and means mounting the paper feed means to the print head for controlled rotation therewith about the shaft.

* * * * *